United States Patent [19]

Hallden-Abberton et al.

[11] Patent Number: 5,616,638
[45] Date of Patent: Apr. 1, 1997

[54] CURED COMPOSITE AND PROCESS THEREFOR

[75] Inventors: Michael Hallden-Abberton, Maple Glen, Pa.; Donald McLeod, Jr., Briarcliff Manor, N.Y.; James S. Ritscher; Scot M. Turner, both of Marietta, Ohio

[73] Assignee: Rohm and Haas Company, Philadelphia, Pa.

[21] Appl. No.: 406,605

[22] Filed: Mar. 20, 1995

[51] Int. Cl.$^6$ .............................. B29D 11/00; B29C 47/06
[52] U.S. Cl. ..................... 524/178; 264/1.29; 385/123; 385/143; 385/145; 524/381; 525/106
[58] Field of Search .................................. 264/1.24, 1.27, 264/1.29, 211.24; 524/178, 381; 525/100, 101, 105, 106; 385/123, 141, 143, 145

[56] References Cited

U.S. PATENT DOCUMENTS 4,478,876  10/1984  Chung .
5,103,032  4/1992  Turner et al. .
5,436,345  7/1995  Lewis et al. .
5,485,541  1/1996  Bigley, Jr. et al. ..................... 264/1.29

FOREIGN PATENT DOCUMENTS

178168A2  9/1985  European Pat. Off. .
629493A1  7/1994  European Pat. Off. .

OTHER PUBLICATIONS

Use of Stable Free Radicals to Inhibit the Copolymerization of Vinyl Monomers; Dopov. Akad. Nauk Ukr. RSR (B) 988 (1991) (CA 88;38214c(1978)).

*Primary Examiner*—Mathieu D. Vargot
*Attorney, Agent, or Firm*—Roger K. Graham, Patent Agent

[57] ABSTRACT

Flexible composites, such as those useful as light pipes, may be effectively cured by reactions upon copolymerized alkoxysilane functionality. Improvements in the optical properties of the uncured and cured systems are found when the alkoxysilane monomer is stabilized during preparation, storage, and copolymerization with low levels of non-aromatic stable free radicals or stable free-radical precursors, such as nitroxides.

11 Claims, No Drawings

CURED COMPOSITE AND PROCESS THEREFOR

This invention relates to processes, continuous processes and related compositions for producing a light pipe with flexibility or a flexible light pipe ("FLP"), and the improved FLP product which the process produces. The invention also relates to efficiently fabricating a FLP having a core diameter of at least 3 millimeters, useful for conveying visible light and which remains flexible and transparent under a wide range of use conditions.

An effective process for preparation of flexible light pipe is disclosed in European Unexamined Patent Application 629,493, published Dec. 15, 1994, now U.S. Pat. No. 5,485,541, herein incorporated by reference.

In one aspect of the process for flexible light pipe disclosed in the cited application, a crosslinkable core mixture is present which comprises an uncrosslinked copolymer formed from (meth)acrylic esters and monomers with functionally reactive alkoxysilane groups, along with a reactive additive to cure the uncrosslinked core polymer by crosslinking it, the reactive additive preferably being water and a silane condensation reaction catalyst, such as an organotin dicarboxylate. The monomers with functionally reactive alkoxysilane groups include 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these.

A difficulty with these silane monomers is that they are difficult to manufacture, transport, and handle without an inhibitor for polymerization, which inhibitor is generally at high level (above 1000 ppm based on alkoxysilane monomer), and is commercially some form of hindered phenolic compound. As the optical requirements for light transmission and color are stringent, and conventional inhibitors at these levels will cause color to occur in the monomer or in the resulting uncured or cured polymer, it is necessary to find a means to remove the inhibitor or to replace it with a much more effective inhibitor which can be used at much lower levels, and whose presence (or presence of reaction products after inhibition or polymerization) do not add to the color or light loss of the resulting uncured or cured FLP. The new inhibitor must also not interfere with the polymerization or curing processes.

In a patent application filed concurrently with the present application and having inventors in common, it has been shown that low levels of non-aromatic stable free radical or stable free-radical precursors, such as nitroxides, nitroxide precursors, and derivatives of nitroxides are effective inhibitors of polymerization of these alkoxysilane-containing monomers even when utilized at low levels, such as 0.05 to 100 ppm, more preferably 0.1 to 25 ppm, and most preferably 1 to 10 ppm, based on the alkoxysilane monomer. This combination of alkoxysilane monomers and non-aromatic stable free radicals is unknown in the prior art.

We have now further found that the use of low levels of these non-aromatic stable free radical or stable free-radical precursors or derivatives further are effective in producing a stabilized alkoxysilane monomer which imparts very little or no additional color at the various stages of preparing a flexible light pipe crosslinked by reaction of the alkoxysilane group. This very little or no additional color is manifested at the monomer mix level, for the uncured polymer, for the cured polymer, and for the cured polymer in use as a carrier for light.

We have thus discovered a process for producing light pipe comprising the steps of:

a) concurrently and coaxially extruding:
  i) a molten fluoropolymer through an annular channel of a coextrusion die to form an extruded tubular fluoropolymer cladding, and
  ii) a crosslinkable core mixture through a core mixture delivery tube of the coextrusion die to form an extruded crosslinkable core mixture within the circumference of the extruded tubular fluoropolymer cladding;
b) filling the extruded tubular fluoropolymer cladding with the extruded crosslinkable core mixture; and
c) curing the extruded crosslinkable core mixture within the extruded tubular fluoropolymer cladding wherein the cured extruded crosslinkable core mixture and the extruded tubular fluoropolymer cladding are in substantially complete contact, wherein the crosslinkable core mixture comprises:
d) from about 95 to about 99.9 weight percent, based on the crosslinkable core mixture weight, of an uncrosslinked copolymer having weight average molecular weight from about 10,000 to about 150,000 daltons, the uncrosslinked copolymer comprising:
  i) from about 77.9 to about 99.9 weight percent, based on the uncrosslinked copolymer weight, of a bulk monomer unit selected from methyl acrylate, ethyl acrylate, n-butyl acrylate, methyl methacrylate, ethyl methacrylate, n-butyl methacrylate, or mixtures thereof;
  ii) from about 0.5 to about 12 weight percent, based on the uncrosslinked copolymer weight, of a functionally reactive monomer selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, the functionally reactive monomer being stabilized with from about 0.05 to about 100 parts per million, based on the functionally reactive monomer, of at least one non-aromatic stable free radical or stable free-radical precursor; and
  iii) from 0 to about 10 weight percent, based on the uncrosslinked copolymer weight, of a refractive index increasing monomer selected from styrene, benzyl acrylate, benzyl methacrylate, phenylethyl acrylate or phenylethyl methacrylate; and
e) from about 0.1 to about 5 weight percent, based on the crosslinkable core mixture weight, of a reactive additive which is water and a silane condensation reaction catalyst. Our invention further contemplates a light pipe product by the above process.

A preferred aspect of this process is that steps (a), (b) and (c) are continuous. A preferred composition of the components of this process is wherein the bulk monomer unit is methyl acrylate, ethyl acrylate, or n-butyl acrylate, or mixtures of these; the functionally reactive monomer is 3-methacryloxypropyltrimethoxysilane or vinyltrimethoxysilane; and the silane condensation reaction catalyst is a dialkyltin dicarboxylate. Especially preferred is the composition wherein the uncrosslinked copolymer is derived from about 94 to about 98 weight percent ethyl acrylate and from about 2 to about 6 weight percent of 3-methacryloxypropyltrimethoxysilane, and the silane condensation reaction catalyst is dibutyltin diacetate.

Another preferred composition of the components of this process is wherein the bulk monomer is methyl methacrylate, ethyl methacrylate, or n-butyl methacrylate and the crosslinkable core mixture further contains an additional amount of from about 1 to about 40 weight percent, based on the weight of the crosslinkable core mixture, of a flexibilizing plasticizer.

The at least one non-aromatic stable free radicals contemplated for use herein are nitroxides, i.e., compounds with at least one N-O● functionality thereon. Examples of nitroxide radicals are dialkyl nitroxides ([$R^1R^2$NO●] where $R^1$ and $R^2$ are alkyl groups of $C_2$ to $C_8$ which are branched or linear and which may have substituents thereon), proxyls [N-oxide cycloazopentane or pyrrolidine N-oxide], doxyls [N-oxide cycloazo-3-oxapentane or oxazolidine N-oxyl], and piperidinyloxy free radicals [N-oxide cycloazohexane or piperidine N-oxyl]. The most useful nitroxides, particularly TEMPO and derivatives, generally have tertiary carbon groups or other sterically hindering groups attached to the nitrogen atoms of the nitroxide groups.

Specific examples of nitroxides include di-tert-butyl nitroxide, tert-amyl tert-butyl nitroxide, 2,2,5,5-tetramethylpyrrolidine-N-oxyl, and 4,4-dimethyl-3-oxazolidine N-oxyl. The most preferable nitroxides are the piperidinyloxy free radicals, particularly, TEMPO (2,2,6,6-tetramethylpiperidine-N-oxyl), 4-hydroxy-TEMPO (4-hydroxy-2,2,6,6-tetramethylpiperidine-N-oxyl, and 4-hydroxy TEMPO benzoate, all commercially available from Aldrich Chemicals of Milwaukee, Wis. The other nitroxides may be manufactured as is well known in the art. See for example Keany, J., Chem. Rev., 78, 37 (1978).

The nitroxides may convert to hydroxyl amines under certain process conditions and these amines do exhibit inhibitor effectiveness, though not as good as the nitroxides. However, such hydroxyl amines are contemplated as being within the present invention. Moreover, nitroxide free radicals may be created in situ and such compositions are contemplated herein as well. Specifically such conversions occur from amine oxides and nitroso compounds. For example, nitroso t-butane (t-butyl-N=O) readily converts to a di-t-butyl nitroxide, and 5,5 dimethyl-1-pyrroline-N-oxide to a 2,2 dimethyl-5-substituted nitroxide radical, by reaction with a free radical.

We further contemplate the invention of a composition for a light pipe crosslinkable core mixture, comprising:

a) from about 95 to about 99.9 weight percent, based on the crosslinkable core mixture weight, of an uncrosslinked copolymer having weight average molecular weight from about 2,000 to about 250,000 daltons, the uncrosslinked copolymer comprising:

i) from about 88 to about 99.9 weight percent, based on the uncrosslinked copolymer weight, of a bulk monomer selected from methyl acrylate, ethyl acrylate, normal butyl acrylate, or mixtures thereof, ii) from about 0.1 to about 12 weight percent, based on the uncrosslinked polymer weight, of a functionally reactive monomer selected from 3-methacryloxypropyltrimethoxysilane or vinyltrimethoxysilane, the functionally reactive monomer being stabilized with from about 0.05 to about 100 parts per million, based on the functionally reactive monomer, of at least one non-aromatic stable free radical or stable free-radical precursor; and b) from about 0.1 to about 5 weight percent, based on the crosslinkable core mixture weight, of a reactive additive comprising water and a dialkyltin dicarboxylate.

Preferred compositions, which relate to the process described above, comprise mixtures wherein the bulk monomer is ethyl acrylate, where the reactive monomer is 3-methacryloxypropyltrimethoxysilane, or where the dialkyltin dicarboxylate is dibutyltin diacetate. Another preferred composition is one wherein the non-aromatic stable free radical is at least one nitroxide.

A light pipe is an organic or inorganic composition, generally of composite structure which is normally above 1 mm. in diameter, preferably 3–20 mm. and which will deliver light from a light source at one end to an outlet at the other end with limited loss of light intensity through the path. It is generally preferred that the pipe be flexible, for ease of installation and use, which implies an organic composition, either a soft, rubbery polymer, or a plasticized harder polymer as the carrier. The carrier itself is generally sheathed or clad with a second polymer of different refractive index which reflects the light within the pipe, and may further have a protective cladding, such as polyethylene, on the outside. (Meth)acrylic polymers, because of their good optical and ultra-violet transmission properties and adequate thermal stability are most useful for this purpose. Desirable properties include ambient temperature flexibility, good transmittance, low yellowness, softness, and property retention under thermal aging conditions. For soft compositions, it is desirable to cross-link the light-carrying polymer to minimize creep and distortion under load or heat. A continuous manufacturing process is desirable for lower cost, more uniform composition, and cleaner product.

As taught in allowed U.S. patent application Ser. No. 08/76,039, the above-described process for producing light pipe comprising concurrently and coaxially extruding a molten fluoropolymer through an annular channel of a coextrusion die to form an extruded tubular fluoropolymer cladding, and a crosslinkable core mixture through a core mixture delivery tube of the coextrusion die to form an extruded crosslinkable core mixture within the circumference of the extruded tubular fluoropolymer cladding, while filling the extruded tubular fluoropolymer cladding with the extruded crosslinkable core mixture; and curing the extruded crosslinkable core mixture within the extruded tubular fluoropolymer cladding wherein the cured extruded crosslinkable core mixture and the extruded tubular fluoropolymer cladding are in substantially complete contact is an efficient and effective process for manufacture of such pipe, especially when the crosslinkable core mixture comprises mainly a low molecular weight non-crosslinked copolymer of certain alkyl (meth)acrylates with certain copolymerizable, functionally reactive monomers with alkoxysilane groups, optionally a third monomer to alter refractive index, and water as a reactive additive to cure the pre-polymer through the pendant alkoxysilane groups, the cure reaction also containing a silane condensation reaction catalyst.

The functionally reactive co-monomers with alkoxysilane groups are high-boiling and susceptible to polymerization reactions at the carbon-carbon double bond during distillation or other purification processes, on storage, or during the preparation of the monomer feeds for the non-crosslinked core copolymer. If inhibited with conventional inhibitors, such as hydroquinone, quinone, hindered phenols, or aminophenols, the level of inhibitor needed contributes to color in the monomer mix, and to color of the uncured and cured core polymer.

For purposes of stabilization of the cured polymer when the light pipe is exposed to heat for long periods of time, it may be necessary further to add thermal stabilizers, such as organic phosphites or organic sulfides, to the reaction mixture just before polymerization. Such phosphites or sulfides, when added at appropriately low levels, should not contribute to the color of the uncured light pipe or to the color of the cured light pipe directly after curing.

Other additives may be included in the crosslinkable core mixture. For example, antioxidants, UV absorbers and UV stabilizers known to diminish photo-degradation and thermal degradation may be added. The level of an additive which can be optionally employed will depend upon the absorption spectrum of the additive, the desired composite or light pipe length and spectral distribution for the intended end use. Depending upon the end use, one or more of the following additives can be employed: among UV stabilizers are included, for example, hindered-amine light stabilizers, 2-hydroxy-benzophenones, 2-hydroxyphenylbenzotriazoles, and transition metal complexes, such as Ni(II) oxime chelates. UV absorbers include benzophenone-derived compounds, benzoates, benzotriazoles, phenyl salicylates, and the like. Among the antioxidants are, for example, mercaptans, thioesters, phosphites, hindered phenols, hindered-amine light stabilizers, and the like. Other additives which may be included in the crosslinkable core mixture include fluorescent dyes or absorbing dyes affording a particularly desired spectral distribution. Anti-static additives may be used to inhibit dust collection on the ends of light pipes, and release agents may be used to reduce adhesion between the core and the cladding, for the purpose of minimizing stress due to differential thermal contraction.

One or more plasticizers may be an additional component to the crosslinkable core mixture. A crosslinkable pre-polymer containing methacrylate, such as $C_1$–$C_4$ alkyl methacrylate can be plasticized such that the resultant material is suitable for use as a crosslinkable core mixture. A crosslinkable pre-polymer containing $C_4$–$C_{18}$ alkyl methacrylate may be utilized without plasticizer.

It is desirable that the plasticizer be very low in volatility (e.g. normal boiling point>300° C.) so that its use does not cause bubble formation during the clad-filling step or affect long-term dimensional stability of the cured composite or light pipe. The plasticizer also should be stable to discoloration under long term heat aging at $\leq$130° C. and on long-term exposure to wavelengths longer than approx. 380 nm. Preferred plasticizers are tri-alkyl citrates and aliphatic esters such as triethyl citrate, acetyltriethyl citrate, tri-n-butyl citrate, or diethyl sebacate. It is contemplated that a crosslinkable core mixture having a Tg significantly above 20° C., for example greater than 40° C., such as exhibited by a polymer of methyl methacrylate or most methyl methacrylate/butyl methacrylate copolymers, could be made flexible for use as a light pipe by the inclusion of sufficient plasticizer. Common plasticizers miscible with uncrosslinked copolymers in light pipes and which meet the volatility, stability, and other requirements mentioned previously, and which could serve as "flexibilizing plasticizers" include the aforementioned aliphatic esters, and, in certain cases, polyethylene glycol, polypropylene glycol, dimethyl phthalate, dibutyl phthalate, dioctyl phthalate and similar materials.

Some uses for the FLPs prepared by the process of the invention include: automotive and transportation uses, such as in headlights, rear appliqués, interior lighting, dashboard lights, accent lights, map readers, interior and exterior lighting of boats, trailers, campers and airplanes, and the like; retail lighting uses, such as in track lighting, display cases, point of purchase displays, and the like; emergency lighting, such as in path of egress, exit signs, pathway indicators, and the like; to indoor and outdoor commercial lighting, such as in down lights, recessed solar collectors, ground level lighting, walkway lighting, airport runway lights, architectural lighting, traffic lights, mining lights, such as hard hat lighting and mine shaft lighting; to remote source systems, such as in prison cells, hazardous environments, zoos, aquariums, art museums, and the like; residential lighting, as in novel lighting for showers, vanities; specific task lighting, such as auto mechanic lighting, surgeon/dentist lighting, "high tech" manufacturing lighting, endoscopes, photographic uses, and the like; signs, such as in neon, edge lit signs with plastics such as Plexiglas™ acrylic resins, video/electronic displays, highway signs, and the like; and, other specialty lighting, such as in toys, underwater lighting, in water fountains, pools, aquariums, bath tubs, hot tubs, deep sea diving, biological research-catalyzing culture growth, plant growth, and the like. Other possible uses include: ionically conductive multilayer films with flexible cores for electrochromic displays, non-metal resistance heaters, touchpads and artificial muscles; chemiluminescent devices; films for safety glass inner layers; fluid layers for puncture healing; thermochromic devices with fast temperature response; and easy-to-handle hydrogels.

Typical Preparation of Methacryloxypropyltrimethoxysilane: A 50 liter glass batch distillation system fitted with packed column, water condenser, refrigerated condenser and vacuum source is charged with 140 lbs. (63.7 kg.) of crude 3-methacryloxypropyltrimethoxysilane (about 90% pure) which is prepared using only high boiling aromatic inhibitors. To this crude material is added 9 ppm of 4-hydroxy TEMPO. The low boiling components are stripped off and the crude is inhibited with an additional 5 ppm 4-hydroxy-TEMPO and 5 ppm TEMPO. The crude is then distilled at about 100° C./3 mm Hg with 110°–130° C. pot temperature to yield 117 lbs. of 99% pure 3-methacryloxypropyl-trimethoxysilane. Product aliquots are deoxygenated and subjected to 140° C. with continuous stirring. Gelation occurs in 133 hours, indicating acceptable monomer stability.

EXAMPLES 1 AND 2

This Example illustrates the improvements in the optical appearance of the monomer mix when the non-aromatic free radical inhibitor of the present invention is used to replace a phenolic inhibitor. In Example 1, the MATS is stabilized with the methyl ether of hydroquinone (MEHQ, also known as p-methoxyphenol) (1000 ppm, based on MATS); in Example 2, the MATS is stabilized with 5 ppm each of TEMPO (2,2,6,6-tetramethylpiperidinyl-N-oxy free radical) and 4-hydroxyTEMPO (4-hydroxy-2,2,6,6-tetramethylpiperidinyl-N-oxy free radical).

Two samples are taken from each monomer. The first is diluted to a 10% concentration in methanol and the absorbance of the solution measured at 292 nm. As shown in the Table, the absorbance for the sample containing the MATS stabilized with the non-aromatic stable free radical is an order of magnitude less than for the commercial sample.

The second test is a neat measurement at 350 nm. (subtracting out the baseline absorbance at 700 nm.), where the visible absorbance is seen to be well more than an order of magnitude higher for the sample containing the MEHQ. The level of TEMPO/4-hydroxyTEMPO is only about 1% of the MEHQ employed, yet both samples of MATS exhibit acceptable stability characteristics as regards storage, shipping, and handling.

Examples 1 and 2 - Absorbance and Color of Stabilized Methacryloxypropyltrimethoxysilane

| Examples | Inhibitor and level (ppm) | Absorption @ 292 nm (10% in methanol) | Δ Absorption @ 350 nm (neat, 10 cm. path length) |
|---|---|---|---|
| #1. Control | MEHQ; 1000 ppm | 2.741 | 2.354 |
| #2. Improved process | TEMPO and 4-hydroxyTEMPO (5 ppm each) | 0.302 | 0.068; 0.088 |
| TEMPO = 2,2,6,6-tetramethylpiperidinyloxy; 4-hydroxyTEMPO = 4-hydroxy-2,2,6,6-tetramethylpiperidinyloxy | MEHQ = methyl ether of hydroquinone | | after subtraction of background absorption @ 700 nm. |

EXAMPLES 3 AND 4

These Examples illustrate the improvements in the optical appearance of the polymer when the non-aromatic free radical inhibitor of the present invention is used to replace a phenolic inhibitor. Monomer mixes similar to Examples 1 and 2 of U.S. Pat. No. 5,485,541 are polymerized by the method of Example 2 of [EP-629,493] U.S. Pat. No. 5,485,541.

Monomer mixes are prepared as follows: To a 5 liter("L") glass round-bottom flask are added and mixed 4100 g of lightly inhibited methyl acrylate (19 ppm MEHQ), 215.8 grams of the functionally reactive monomer, 3-methacryloxypropyltrimethoxysilane (MATS) (5 wt. % based on monomer weight (b.o.m.)), 0.691 g. of initiator (recrystallized 2,2'-azobis(2-methylbutanenitrile) (0.016 wt. %) and 43.2 g of n-dodecyl mercaptan (1 wt. %). The mixture is sparged for at least 10 minutes with nitrogen and degassed under 25–50 mm Hg pressure for at least 10 minutes.

The monomer mix is fed through a 0.1 micron PTFE membrane cartridge filter to a 2000 ml stainless steel CSTR. During polymerization, flow rates for the 2000 ml CSTR are ca. 70 g/min. The CSTR is equipped with multiple blade 45° pitch turbine agitators. During polymerization, the reactors are held at 125° C., agitated at 200 rpm under a pressure of 1034 kPa (150 psi). Reactor effluent (copolymer and residual monomer) is fed through a back-pressure valve set nominally at 1035 kPa (150 psi) into a devolatilization column comprising a stainless steel twisted-tape motionless mixer (60 cm. in length with a jacket of about 50 cm length) mounted on an 8-L (ca. 2-gallon) stainless steel catchpot. Heating oil recirculated through the column jacket is held at 170°–200° C. at the jacket inlet. The catch-pot is held at 100°–110° C. and less than 10 mbar vacuum during devolatilization. To minimize the entry of oxygen and particulates into the catch-pot through vacuum leaks, the catch-pot is enclosed in an autoclavable polypropylene bag filled with 0.1 micron-filtered nitrogen. Upon completion of the polymerization, the catch-pot is back-filled with filtered nitrogen.

The monomer-to-polymer conversion of the effluent is approximately 80%, as measured gravimetrically. Gravimetrically determined solids content of the devolatilized polymer typically is ≧99 wt. %, but in this instance was ca. 85% for all samples measured. The polymerization and processing behavior of both examples is essentially identical, although the product has excess residual monomer to be suitable for curing, aging and property studies.

Measurements of color and loss on these samples are made by methods taught in EP-629,493, viz., monitored with a non-destructive interference filter method. This method employed sections of light pipe either 1.5 or 2.5 m in length and the source, integrating sphere and interference filters. For white light measurements, the excitation is restricted mainly to the visible spectrum through use of a hot mirror. The sample length is measured, its transmission is monitored with various filters, it is aged and then re-measured. Changes are monitored through the ratio of short wavelength transmission values relative to transmission at 600 nm.; absorption at such long wavelengths is relatively unaffected by degradation, except in the most severe cases. Because only changes in transmission are studied, reflective losses and refractive index dispersion effects can be neglected. Percentage decreases in the ratio of short wavelength to 600 nm transmittance are treated as loss percentages over the length of the sample; the resultant values are termed the "changes in differential loss".

Both "stabilized" preparations give acceptable results as regards color and light loss, but the sample stabilized with the non-aromatic free radical has better optical performance.

Examples 3 and 4 - Color and Loss of Uncured Light Pipe

| Examples | Inhibitor and level (ppm) | Color (Δ ABS 400–600 nm) | Loss @ 450 nm, dB/M | Loss @ 500 nm, dB/M |
|---|---|---|---|---|
| #3. Control | MEHQ; ca. 30 ppm | 0.88 ± 0.01 | 0.30 | 0.14 |
| #4. Improved process | TEMPO and 4-hydroxyTEMPO; ca. 1 ppm each | 0.80 ± 0.01 | 0.27 | 0.12 |
| TEMPO = 2,2,6,6-tetramethylpiperidinyloxy; 4-hydroxyTEMPO = 4-hydroxy-2,2,6,6-tetramethylpiperinyloxy | MEHQ = methyl ether of hydroquinone (level in monomer mix; Δ ABS = difference between background absorption at 600 nm and absorption at 400 nm indicating color formation) | | | |

EXAMPLES 5 AND 6

In a manner similar to Examples 3 and 4, ethyl acrylate is substituted for methyl acrylate. The polymerizations, curing, and processing ran smoothly for both types of MATS samples, and color results on the cured samples were similar and acceptable.

FLP with an average outside diameter of 5.65 mm. A stable running condition is easily maintained at a production rate of 6.4 m./min.

The product is cured for 2 weeks at 90° C.

| | Examples 7 to 9 Color and Loss of Cured Light Pipe | | | |
|---|---|---|---|---|
| Examples | Inhibitor and level (ppm) | Color (Δ ABS 400–600 nm) | Loss @ 450 nm, dB/M | Loss @ 500 nm, dB/M |
| #7. Control | MEHQ; 40 ppm | 2.97 | 1.80 | 1.23 |
| #8. Uninhibited MATS | none | 4.70 | 2.84 | 1.56 |
| #9. Improved process | TEMPO and 4-hydroxyTEMPO; 1 ppm each | 2.91 | 1.40 | 0.97 |
| TEMPO = 2,2,6,6-tetramethylpiperidinyloxy; 4-hydroxyTEMPO = 4-hydroxy-2,2,6,6-tetramethylpiperidinyloxy | MEHQ = methyl ether of hydroquinone; Δ ABS = difference between background absorption at 600 nm and absorption at 400 nm indicating color formation | Average of 10 samples for #5, 2 for #6 and 2 for #7; ppm refer to parts in monomer mix | | |

EXAMPLES 7, 8, AND 9

This comparison illustrates that the color of cured samples where the MATS contains a non-aromatic stable free-radical is better than that for a MATS sample prepared inhibitor-free.

Samples are prepared from the formula exemplified in Examples 3 and 4, but with ethyl acrylate as the monomer. After four reactor volumes of monomer has been pumped to the reactor, the reactor effluent is heated to 200° C. and diverted into a falling strand devolatilization column. The walls of devolatilization column are maintained at 90° C. and the column pressure held at 12 mm Hg. The copolymer is allowed to accumulate to a height of about 20 cm. before a gear pump, mounted at the base of the column, is started. The gear pump speed is set to match the production rate of devolatilized copolymer so that the column level did not change.

The copolymer is pumped out of the column at 147 g./min. through a static mixer heat exchanger where the melt temperature is reduced from 100° C. to about 80° C. The copolymer continued to flow through electrically heated lines to a stirred mixer where dibutyltin diacetate in a butyl acetate carrier and water are mixed into the copolymer. The dibutyltin diacetate stream is delivered at a rate of 0.40 cc/min. and the water delivery rate is 0.54 cc/min. A separate syringe pump is used to deliver each stream to the mixer. The 160 cc mixer is run at 500 RPM and contained two 5.7 cm. diameter 6-blade impellers.

The water, catalyst and uncrosslinked copolymer passed from the mixer exit to a second static mixer heat exchanger where the copolymer temperature is reduced to about 75° C. The copolymer then passed from the static mixer exit to a jacketed core mixture tube mounted along the axis of a coextrusion die, described herein and in FIG. 2. Teflon™ FEP is delivered to the coextrusion die at a rate of 58.5 grams/min. and the jacketed core mixture tube is mounted along the axis of a coextrusion die. Teflon™ FE is delivered to the coextrusion die at a rate of 58.5 grams/min. and the jacketed core mixture delivery tube is retracted so that contact is not made with the FEP melt core. The uncrosslinked polymer filled the Teflon™ tube to produce an

We claim:

1. A process for producing light pipe comprising the steps of:
    (a) concurrently and coaxially extruding:
        i) a molten fluoropolymer through an annular channel of a coextrusion die to form an extruded tubular fluoropolymer cladding, and
        ii) a crosslinkable core mixture through a core mixture delivery tube of the coextrusion die to form an extruded crosslinkable core mixture within the circumference of the extruded tubular fluoropolymer cladding;
    (b) filling the extruded tubular fluoropolymer cladding with the extruded crosslinkable core mixture; and
    (c) curing the extruded crosslinkable core mixture within the extruded tubular fluoropolymer cladding wherein the cured extruded crosslinkable core mixture and the extruded tubular fluoropolymer cladding are in substantially complete contact, wherein the crosslinkable core mixture comprises:
    (d) from about 95 to about 99.9 weight percent, based on the crosslinkable core mixture weight, of an uncrosslinked copolymer having weight average molecular weight from about 10,000 to about 150,000 daltons, the uncrosslinked copolymer comprising:
        i) from about 77.9 to about 99.9 weight percent, based on the uncrosslinked copolymer weight, of a bulk monomer unit selected from methyl acrylate, ethyl acrylate, n-butyl acrylate, methyl methacrylate, ethyl methacrylate, n-butyl methacrylate, or mixtures thereof;
        ii) from about 0.5 to about 12 weight percent, based on the uncrosslinked copolymer weight, of a functionally reactive monomer selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, the functionally reactive monomer being stabilized with from about 0.05 to about 100 parts per million, based on the functionally reactive monomer, of at least one non-aromatic stable free radical or stable free-radical precursor; and iii) from 0 to about 10 weight percent, based on the uncrosslinked copolymer weight, of a refractive index increasing monomer selected from styrene, benzyl acrylate, benzyl methacrylate, phenylethyl acrylate or phenylethyl methacrylate; and (e) from about 0.1 to about 5 weight percent, based on the crosslinkable core mixture weight, of a reactive additive which is water and a silane condensation reaction catalyst; wherein the light pipe so formed has improved color (as measured by the ratio of short wavelength transmission values relative to transmission values at 600 nm) and lower light loss at equal transmission length relative to otherwise equivalent light pipe prepared with the functionally reactive monomer absent the at least one non-aromatic stable free radical or stable free-radical precursor.

2. The process of claim 1 wherein steps (a), (b) and (c) are continuous.

3. The process of claim 1 wherein a) the bulk monomer unit is methyl acrylate, ethyl acrylate, or n-butyl acrylate, or mixtures of these;

b) the functionally reactive monomer is 3-methacryloxypropyltrimethoxysilane or vinyltrimethoxysilane; and c) the silane condensation reaction catalyst is a dialkyltin dicarboxylate.

4. The process of claim 3 wherein the uncrosslinked copolymer is derived from about 94 to about 98 weight percent ethyl acrylate and from about 2 to about 6 weight percent of 3-methacryloxypropyltrimethoxysilane, and the silane condensation reaction catalyst is dibutyltin diacetate.

5. The process of claim 1 wherein the bulk monomer is methyl methacrylate, ethyl methacrylate, or n-butyl methacrylate and the crosslinkable core mixture further contains an additional amount of from about 1 to about 40 weight percent, based on the weight of the crosslinkable core mixture, of a flexibilizing plasticizer.

6. The process of claim 4 wherein the non-aromatic stable free radical is a nitroxide.

7. The process of claim 6 wherein the nitroxide is at least one of 2,2,6,6-tetramethylpiperidinyloxy free radical, 4-hydroxy-2,2,6,6-tetramethylpiperidinyloxy free radical, di-t-butyl nitroxide, t-amyl-t-butyl nitroxide, 2,2,5,5-tetramethylpyrrolidine-N-oxyl, or 4,4-dimethyl-3-oxazolidine-N-oxyl.

8. A product by the process of claim 1.

9. A composition for a light pipe crosslinkable core mixture, comprising:

(a) from about 95 to about 99.9 weight percent, based on the crosslinkable core mixture weight, of an uncrosslinked copolymer having weight average molecular weight from about 2,000 to about 250,000 daltons, the uncrosslinked copolymer comprising:

i) from about 88 to about 99.9 weight percent, based on the uncrosslinked copolymer weight, of a bulk monomer selected from methyl acrylate, ethyl acrylate, normal butyl acrylate, or mixtures thereof, ii) from about 0.1 to about 12 weight percent, based on the uncrosslinked polymer weight, of a functionally reactive monomer selected from 3-methacryloxypropyltrimethoxysilane or vinyltrimethoxysilane, the functionally reactive monomer being stabilized with from about 0.05 to about 100 parts per million, based on the functionally reactive monomer, of at least one of a non-aromatic stable free radical or stable free-radical precursor; and (b) from about 0.1 to about 5 weight percent, based on the crosslinkable core mixture weight, of a reactive additive comprising water and a dialkyltin dicarboxylate; wherein the light pipe crosslinkable core so formed has improved color (as measured by the ratio of short wavelength transmission values relative to transmission at 600 nm) and lower light loss at equal transmission length relative to otherwise equivalent light pipe crosslinkable core prepared with the functionally reactive monomer absent the at least one non-aromatic stable free radical or stable free-radical precursor.

10. The composition of claim 7 wherein a) the bulk monomer is ethyl acrylate;

b) the reactive monomer is 3-methacryloxypropyltrimethoxysilane; and c) the dialkyltin dicarboxylate is dibutyltin diacetate.

11. The composition of claim 7 wherein the non-aromatic stable free radical is at least one nitroxide.

* * * * *